Oct. 12, 1965

P. MARSAL 3,211,588

DEFERRED ACTION BATTERY

Filed Jan. 5, 1946

INVENTOR
PAUL MARSAL
BY
ATTORNEY

United States Patent Office 3,211,588
Patented Oct. 12, 1965

3,211,588
DEFERRED ACTION BATTERY
Paul Marsal, Rocky River, Ohio, assignor, by mesne assignments, to the United States of America as represented by the Secretary of the Navy
Filed Jan. 5, 1946, Ser. No. 639,278
5 Claims. (Cl. 136—90)

This invention relates to deferred action batteries.

An object of the invention is to provide a battery of a deferred action type of galvanic cells, suitable for use in a projectile, to provide a source of cathode-heating or "A" voltage, and a source of bias voltage, as is customarily provided in a radio receiver by a "C" battery; another object is to provide two or more such batteries which share a common body of electrolyte; and a further object is to provide, in combination, one or more such batteries with one or more "B" batteries, all sharing in common a body of electrolyte.

Another object is to provide a compact power supply, suitable for use in a projectile, comprising in combination one or more of each of the aforementioned "A," "B" and "C" types of batteries; and a further object is such a combination in which a stored electrolyte automatically becomes distributed to all of said batteries from a single reservoir when a projectile containing the power supply is fired from a rifled gun.

In the copending application Ser. No. 501,001, now Patent No. 3,003,016, of the same inventor, there is described a battery which consists essentially of a plurality of annular electrode elements assembled coaxially to form a series of cells; intercell insulation between the electrode elements; a supply of stored electrolyte disposed generally along the axis of the annuli; means for distributing the electrolyte from the said supply to the electrode elements; and a rigid outer container. In some embodiments, a further cell is disposed between the stored supply of electrolyte and the inner margins of the annular electrodes.

The present invention comprises certain novel improvements in the battery described and claimed in said earlier-filed application. In general, these improvements comprise the following novel features which improve the performance characteristics of the battery: a device of novel construction and arrangement for supporting an electrolyte-containing frangible ampoule, which device also contributes to a desired distribution of electrolyte when the battery is put into use; and a novel construction and arrangement of annular electrode elements and associated intercell insulation, which further contributes to the desired distribution of electrolyte even under unusual and adverse conditions of use in the battery.

The invention will be described with particular reference to the accompanying drawings, in which FIG. 1 is a sectional view of a cylindrical device embodying features of this invention, certain of the dimensions being considerably exaggerated for clarity of illustration;

Figure 3:
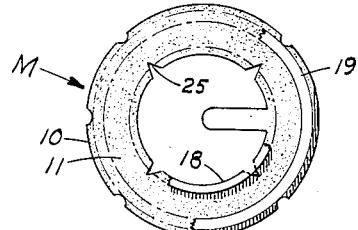
FIG. 3 is another detail, in plan and reduced scale.
Figure 4:
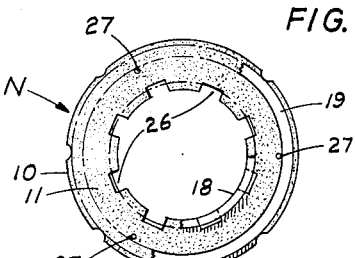
FIG. 4 is a further detail thereof, in plan and reduced scale.

Referring to the drawing, the cylindrical device shown comprises a flat annular end electrode 8 provided with a tab 9, a plurality of flat annular electrode units M of the configuration shown in FIG. 3, the lowermost of which units is provided with a tab, and a plurality of flat annular electrode units N of a different configuration as shown in FIG. 4, each of such units M and N consisting of a soluble metal anode element 10 coated on one side with an electrolyte-impervious electrically conductive insoluble cathode element 11. Between the groups of elements M and N are tabbed units O and P, both of the same configuration as units M but respectively uncoated and coated on both sides. A group of axially alined units M is assembled coaxially with a group of axially alined units N in such manner that the anode element of each unit M or N faces the cathode element of the next adjacent unit M or N respectively. The elements O and P are alternately arranged so that a unit O is adjacent to the cathode surface of the topmost unit N and a unit P is adjacent to the anode surface of the lowermost unit M. At the bottom of the units N is a coated, untabbed, end electrode 12.

Each of the first-mentioned flat annular electrode units M, shown in reduced scale in FIG. 3, consists of a soluble metal body 10 coated on one side with an electrolyte-insoluble electrically conductive layer 11. As an example the body 10 may be of zinc and the insoluble layer 11 may be a carbon-filled varnish as described for instance in U.S. Patent 1,508,987; but other anode and cathode materials may be used, depending upon the kind of electrolyte and upon the cell voltage desired. The units P may be of any metal coated on both sides with a suitable cathode material, for instance a similar carbon-filled varnish. The units O are of uncoated soluble metal, for instance zinc.

If it is desired to use very thin electrode metal, improved stiffness and strength may be achieved by using zinc alloys or by using zinc-coated cold-rolled steel sheet material.

Each of the flat annular electrode units N, shown in reduced scale in FIG. 4, also consists of a soluble metal body 10 coated on one side with an electrolyte-insoluble electrically conductive layer 11, ordinarily of the same materials as those used for the first-mentioned units M but not necessarily so.

Within the central cavity formed by the assembled annular units M, N, O, P, is an ampoule-supporting thimble T, and within the thimble T is a frangible ampoule 13 containing a supply of electrolyte 14.

Figure 1:
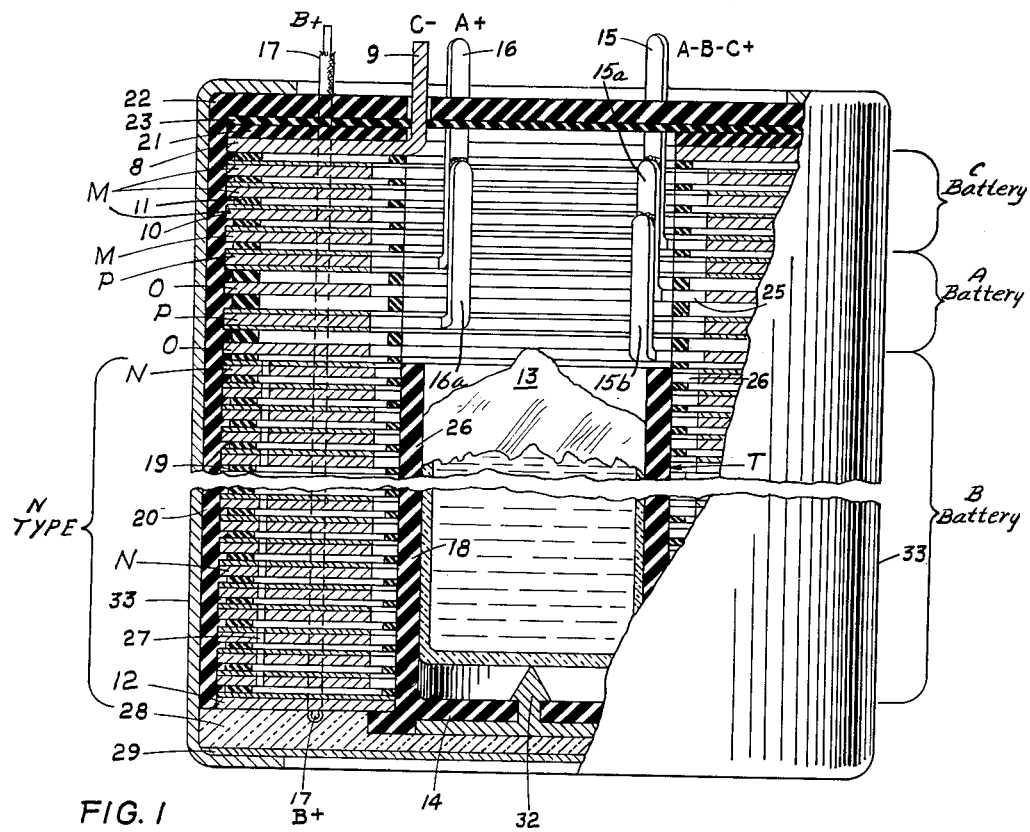

As shown in FIG. 1, electrical connection is made to the tab of the top end electrode 8 and another electrical connection 15 is made to the bottom unit of M to form a series-connected battery, the first-mentioned connection being for instance C— and the second-mentioned C+. Below C+ the anode units O are connected to C+ (15) through the additional tabs 15a and 15b, which are permanently mechanically and electrically secured to the tab 15 in any suitable way, as by soldering, spot welding or the like and the cathode units P are connected to a third connection 16, as by means of the additional tab 16a which likewise is soldered or otherwise connected to tab 16, similarly to the above, thus forming a parallel-connected "A" battery of four cells, the connection to C+ (15) serving as A— and the connection 16 serving as A+. Below the last of the foregoing units O is a series of units N, and the bottom end electrode 12 is tapped by a connection 17 which serves as B+. In such an arrangement, the connection 15 serves as B—, A—, and C+.

It will be evident that by suitable choice of units, connections, and taps, various parallel, or series, or series-parallel groupings of units M, N, O and P may be achieved to yield desired voltage and amperage characteristics. The connections shown in FIG. 1 are merely by way of example.

In the stack of coaxially disposed units M, N, O, P, adjacent units are separated by insulating washers 18 at the inner margins. The outer margins of the individual cells may be sealed and insulated as described and shown in the previously-mentioned copending application or, as shown in FIG. 1, each by an outer insulating washer 19 and with a shell 20 of thermoplastic or thermosetting synthetic resin molded in place about the assembled units M, N, O, P. The resulting spaces between adjacent units are available for the electrolyte to form an operative battery. The latter method and means of sealing and insulating form no part of the present invention.

At the top of the assembled units and above the top end electrode 8 a rigid insulating washer 21 may be provided for support (although it is not essential) and a rigid insulating disk 22 serves as an end closure. Between the washer 21 and the disk 22, a thin sheet 23 of rubber or rubber-like material may be provided as a seal.

At the bottom of the assembled units and below the bottom end electrode 12 a rigid insulating washer (not shown) similar to the top washer 21 may be used; but it is not necessary. A thermoplastic insulating potting compound 28 and an end disk 29 seal the bottom of he battery. A metal container 33 surrounds and protects the assembled battery.

The inner margin of each of these units M, O, P, is provided with a plurality of V-shaped notches 25 which serve to control the distribution of electrolyte in a manner which will be described hereinbelow. The top end electrode 8 is similar to the units O but has no notches.

The inner margin of each of these units N is provided with a plurality of rectangular notches 26 which serve functions which will be described below. Three small holes 27 are provided at equal intervals around the outer edges of each such unit N, each hole being so spaced from the outer edge that it is just inside the inner edge of the outer washer 19. These three holes 27 serve to establish and maintain similar electrolyte levels in all intercell spaces between adjacent units N, as will be described. The bottom end electrode 12 is similar to the units N but has neither holes nor notches.

Figure 2:
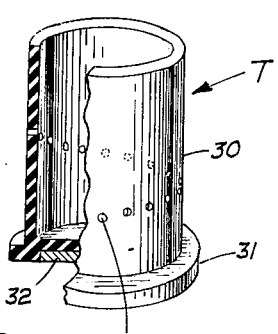
FIG. 2 is a detail, partly in section, of the device shown in FIG. 1.

As shown in FIGS. 1 and 2, the thimble T, which may be formed of any insulating material tough enough to withstand the setback shock, comprises a sleeve portion 30 and a base portion 31. The sleeve portion 30 is substantially cylindrical, but the sidewall outer diameter is preferably slightly greater near the base than near the top to provide a firm fit within the central cavity of the assembled annular cell units.

The base portion 31 of the thimble T extends beyond the walls of the sleeve portion 30 to provide a shoulder which anchors the thimble T in position within the assembled device as shown in FIG. 1. Preferably, the base portion 31 is provided with means to insure the breaking of the ampoule 13 under setback shock. A simple means is illustrated, and consists of a pointed metal button 32 embedded and sealed in the base of the thimble T; but other, more elaborate means may be used if desired, for instance in the event that the conditions of use do not impose a very great setback shock.

The thimble T performs a number of valuable functions in addition to that of supporting and protecting the ampoule 13. It serves as a container for the fragments of the ampoule after the latter is broken, and it guides the electrolyte forward, after the ampoule is broken and the electrolyte 14 is thrown backward by the setback shock and outward by the centrifugal force of the spin, to fill the cells in the forward end of the device.

Under the influence of the centrifugal forces produced by spin of a projectile containing the device, the electrolyte seeks to travel toward the outer portions of the device. Guided by the thimble T, the electrolyte flows into and fills the spaces between the upper units M, and overflows through the V-notches 25 into the group of lower units N, the depth of the V-notches determining the electrolyte level in the upper units M. Distribution of the electrolyte into and among the cell spaces between the units N may take place both through the notches 26 and through the outer small holes 27.

The notches 26 are deep enough, as shown in FIG. 4, to extend beyond the spacing washer 18, providing passages for ingress of electrolyte and for egress of air, the latter being displaced into the central part of the assembled device. If, perchance, electrolyte gets between the thimble T and the inner edges of the units N, it is thrown through the open ends of the notches 26 into the cells.

The small holes 27 permit the electrolyte to assume the same level in all of the cells constituting the units N, which level is no deeper than, but otherwise independent of the level in the units M, O, P. Three holes 27, distributed as shown, permit this result even in the event that the spin of the device is not exactly axial. More than three holes are unnecessary, and would be undesirable because they would increase the paths of electrical short circuit between adjacent cells. Three very small holes provide a system having enough electrical resistance to permit no more than a tolerable short circuit current. It will sometimes be advantageous to provide similar small holes in the units M, O, and P for a similar purpose; but in such a case it may be advisable not to provide such holes in one or more of the units M, O, P, for instance not in the lowest uncoated unit O.

Figure 5:
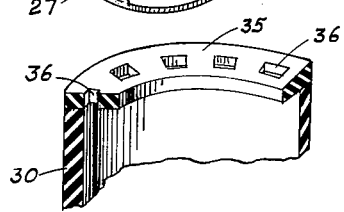
FIG. 5 is a fragmentary detail of an alternative form of the structure shown in FIG. 2.

If it be desired to control the rate of flow of electrolyte from the broken ampoule to the cells, the thimble T may be modified in one or both of two ways. The wall of the thimble may be made of a porous material or be provided with inserts of porous material or, preferably may be provided with ports 34 in any suitable size, shape, and distribution. The top edge of the wall of the thimble may be turned in or provided with a cemented-on collar 35 as shown in FIG. 5, and the dam thus formed may be provided with ports 36 which exercise control over the flow of liquid through the upper end of the thimble T. Alternatively to the collar 35, a perforated dome to cover the entire top of the ampoule may be cemented to the top of the thimble. Such a dome will also serve the function of retaining broken glass.

The electrolyte 14 preferably contains not only the solvent for the anode but also a dissolved or suspended depolarizer. A preferred electrolyte is one comprising water, sulfuric acid, and chromic acid, in the proportions of 0.25 to 0.5 gram of $H_2SO_4$ and 0.2 to 0.3 gram of $CrO_3$ per milliliter of electrolyte. Other appropriate electrolytes are those comprising ferric chloride and chromic acid; perchloric and chromic acids; bromine and sodium bromide. All of these electrolytes are very active and promptly attack the anode metal when brought into contact therewith.

An amount of electrolyte should be used eventually to supply all of the interelectrode spaces with at least an operable minimum quantity but not so great an amount as permanently to flood the V-notches 25 or slots 26. As there is usually little change in performance of the battery over a considerable range of electrolyte levels, some variation in electrolyte volume is permissible.

It is evident that modifications of details illustrated or described may be made without departing from the invention. Further, in the drawings the thickness of section of some parts has necessarily been considerably exaggerated for clarity of illustration. Therefore, the drawings and the description thereof are to be understood as illustrating principles of the invention and not as illustrating the only way to carry out the invention.

What is claimed is:

1. In a galvanic battery of the deferred action type, suitable for use in a projectile, comprising a plurality of substantially flat annular electrode units assembled coaxially in face-to-face relation, a stored supply of electrolyte, insulating material disposed between the outer peripheral margins of adjacent units to provide between each pair of consecutive units a cell for electrolyte, and a rigid outer container; the improvement which comprises electrode units each provided with a plurality of small holes therethrough, located just inside the said insulating material at the peripheral margins, said holes serving to establish and maintain a uniform radial depth of electrolyte in all said cells in response to the centrifugal force produced when said battery is rapidly revolved about substantially its longitudinal axis yet not introducing an intolerable electrical short circuit.

2. In a galvanic battery of the deferred action type, suitable for use in a projecticle, comprising a plurality of substantially flat annular electrode units assembled coaxially in face-to-face relation, a stored supply of electrolyte, insulating material disposed between the outer peripheral margins of adjacent units to provide between each pair of consecutive units a cell for electrolyte, and a rigid outer container; the improvement which comprises annular electrode units each provided with three small holes therethrough located equidistantly and just inside the said insulating material at the peripheral margins, said holes serving to establish and maintain a uniform radial depth of electrolyte in all said cells in response to the centrifugal force produced when said battery is rapidly revolved about substantially its longitudinal axis yet not introducing an intolerable electrical short circuit.

3. In a galvanic battery of the deferred action type, suitable for use in a projectile, comprising a plurality of substantially flat annular electrode units assembled coaxially in face-to-face relation, a stored supply of electrolyte, insulating material disposed between the outer peripheral margins of adjacent units to provide between each pair of consecutive units a cell for electrolyte, and a rigid outer container; the improvement which comprises two groups of annular electrode units, the units of one group being provided with a plurality of V-shaped notches opening into the centers of the annuli and the units of the other group being provided with a plurality of small holes therethrough, located just inside the said insulating material at the peripheral margins, said notches and holes serving to establish and maintain a uniform radial depth of electrolyte in all said cells of each said group independently of the other said group in response to the centrifugal force produced when said battery is rapidly revolved about substantially its longitudinal axis, yet not introducing an intolerable electrical short circuit.

4. A galvanic battery as claimed in claim 3, further characterized in that the units provided with said holes are also provided with a plurality of rectangular notches opening into the centers of the annuli.

5. In a galvanic battery of the deferred action type, suitable for use in a projectile, comprising a plurality of open-center electrode units assembled coaxially, thus forming a central cavity surrounded by said units, and a frangible ampoule containing electrolyte in said cavity, the improvement which comprises a thimble made of insulating material which closely surrounds said ampoule and which is secured in fixed relation to said assembled units, said thimble having a side wall formed with a plurality of ports arranged in an annular series of spiral configuration.

References Cited by the Examiner
UNITED STATES PATENTS

| | | | |
|---|---|---|---|
| 362,640 | 5/87 | Ludlow | 136—6.3 |
| 557,355 | 3/96 | Baynton | 136—102.5 X |
| 576,936 | 2/97 | Badt | 136—169.1 |
| 1,015,317 | 1/12 | Humel. | |
| 1,359,201 | 11/20 | Sheahan | 136—113.3 |
| 1,582,687 | 4/26 | Ramsey | 136—136.1 X |
| 2,918,516 | 12/59 | Everett | 136—90 |
| 2,918,517 | 12/59 | Everett | 136—90 |

FOREIGN PATENTS 526,800    9/40    Great Britain.

OTHER REFERENCES

Kleiderer: "Modern Plastics" November 1945 (pp. 133, 136, 206).

W. A. DOUGLAS, *Primary Examiner.*

R. L. GLASS, F. P. McDERMONT, *Examiners.*